April 30, 1946.   N. F. AGNEW ET AL   2,399,305
DIMENSION MEARUREMENT
Filed June 30, 1943   3 Sheets-Sheet 1

INVENTORS
Norman F. Agnew and
BY Willard P. Place.
L. E. Spray
THEIR ATTORNEY

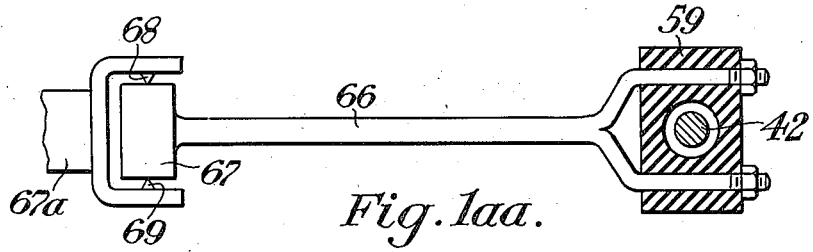
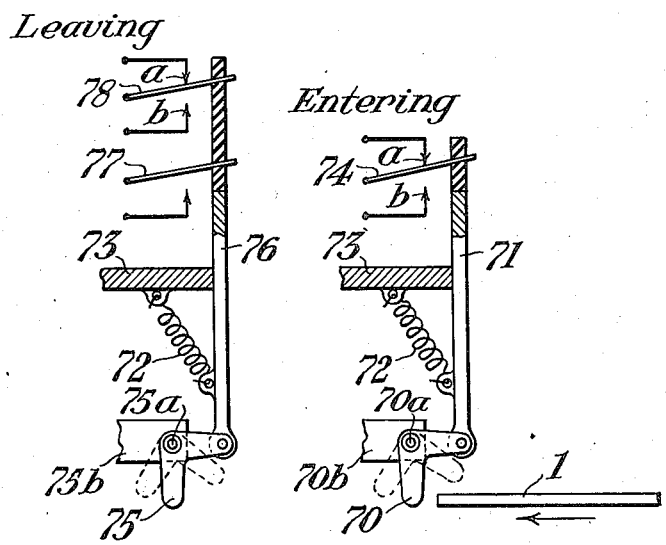
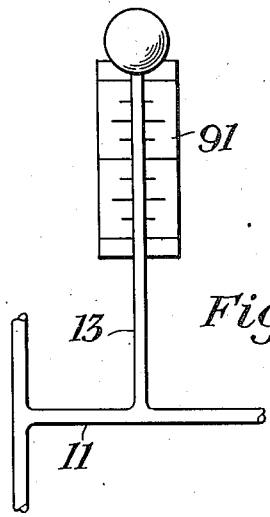

Patented Apr. 30, 1946

2,399,305

UNITED STATES PATENT OFFICE 2,399,305

DIMENSION MEASUREMENT

Norman Frederick Agnew and Willard P. Place, Penn Township, Allegheny County, Pa.

Application June 30, 1943, Serial No. 492,864

21 Claims. (Cl. 33—147)

Our invention relates to dimension measurement, and particularly to a method and to apparatus for measuring or gauging thickness or width of pieces of material, such for example as sheets of iron or steel.

It has previously been common practice to make such measurements by hand. This is a very tedious procedure, especially if, for example, the required degree of accuracy makes it necessary to use micrometers in measuring thickness of sheet material.

One feature of our invention is the provision of a method involving the displacement of a fluid in accordance with the magnitude of a given dimension, and the determination of the magnitude of the given dimension by the extent of displacement of the fluid.

Another feature of our invention is the provision of apparatus comprising bellows means operable in accordance with the magnitude of a given dimension which is being measured, and a fluid displaced in a given container by the bellows means for effecting indication of the magnitude of the given dimension.

We shall describe the method and two forms of apparatus embodying our invention, and shall then point out the novel features thereof in claims.

Figure 1A:
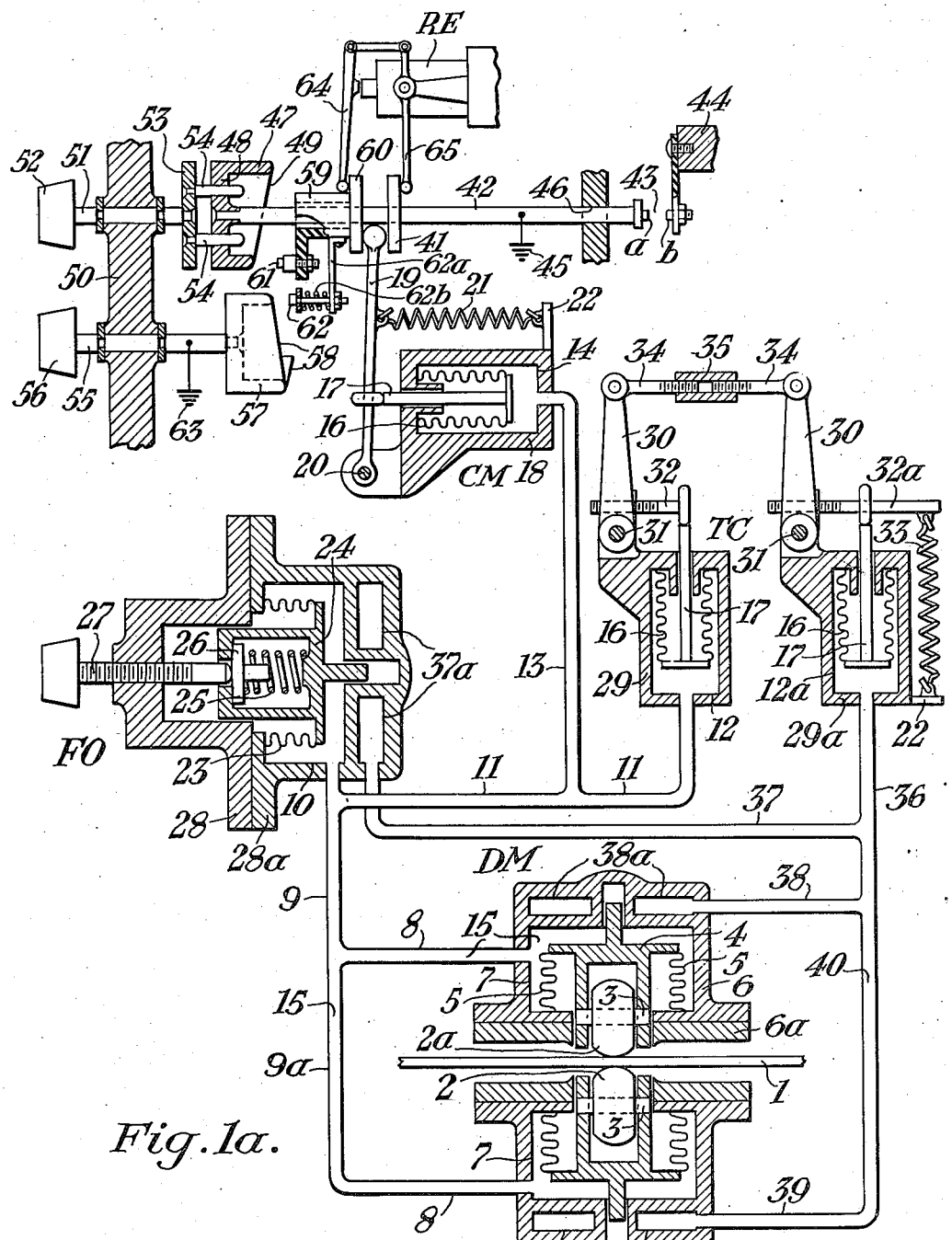
Figure 1C:
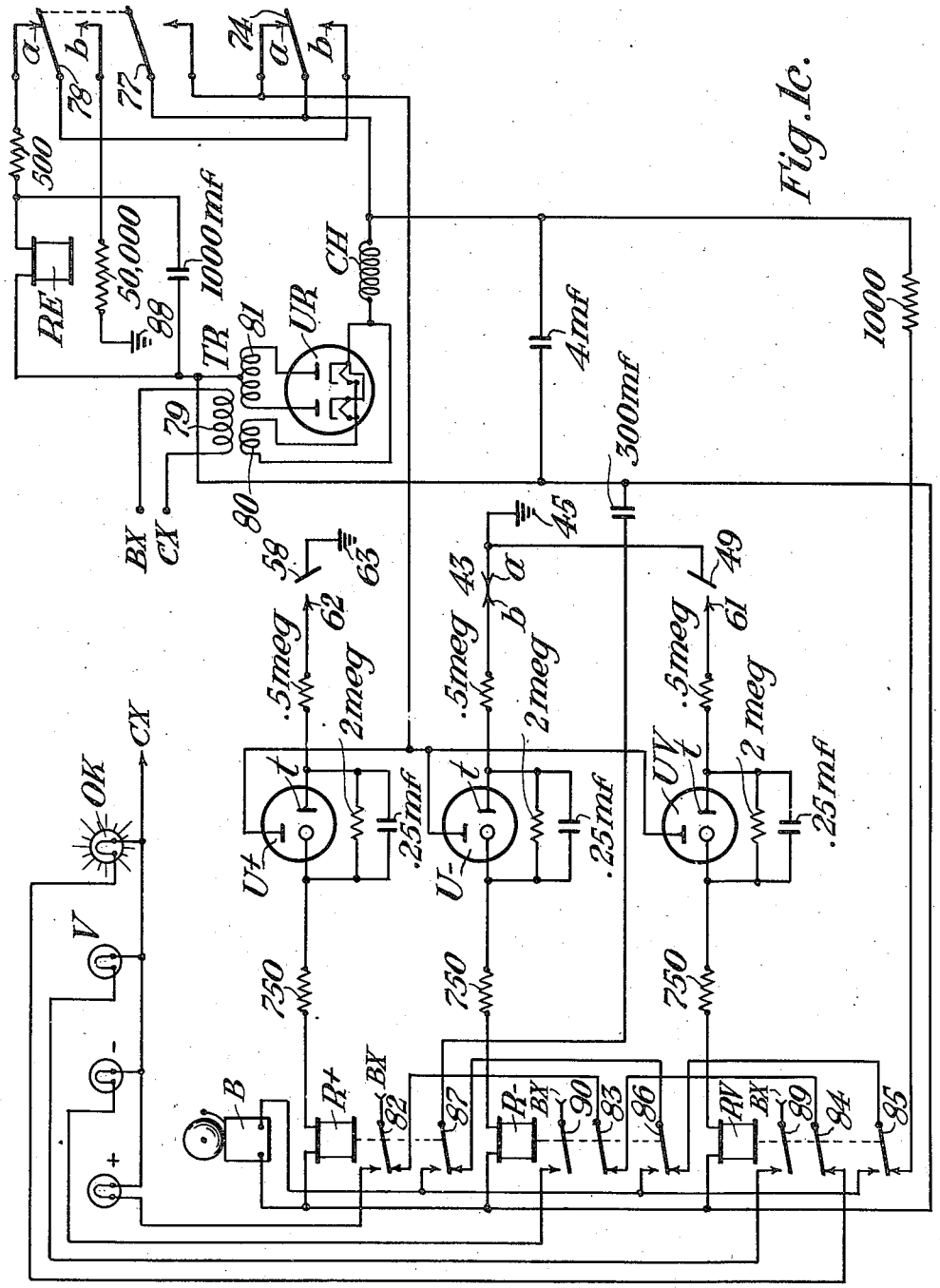

In the accompanying drawings, Figs. 1a, 1aa, 1b, and 1c are views, partly diagrammatic, showing one form of apparatus embodying our invention, and Fig. 2 is a view showing a modification of a portion of the apparatus shown in Fig. 1a, and also embodying a portion of our invention. More specifically, Fig. 1a shows bellows means operable by a pair of rollers in response to the thickness of a sheet of material passing between the rollers, and shows electrical contacts which become closed in response to displacement of a fluid by the bellows means if the sheet of material is too thin or too thick or if there is too much variation in thickness of the sheet of material; Fig. 1aa is an enlarged view of the supporting means for a portion of the electrical contacting means shown in Fig. 1a; Fig. 1b shows electrical contacts operated by a sheet of material when it is about to pass between the rollers shown in Fig. 1a, and just after it has started between these rollers, and also when it is about to leave, and just after it has left the rollers; Fig. 1c is a circuit diagram showing indication devices controlled by the electrical contacts which are shown in Figs. 1a and 1b; and Fig. 2 shows means for indicating sheet thickness by the height of the displaced fluid in a tube or conduit instead of by the electrically controlled indication devices which are shown in Fig. 1c, or in addition to the electrically controlled indication devices.

Similar reference characters refer to similar parts in each of the views.

Referring first to Fig. 1a, a sheet 1 is shown passing between rollers 2 and 2a of a detector mechanism DM in a direction which is perpendicular to the plane of the drawings. Although only one mechanism DM is shown in the drawings, a plurality of such mechanisms may be used, as for example, in gauging a sheet three feet wide, three such mechanisms may be used, one along the middle line of the sheet, a second along a line four inches from one edge of the sheet, and a third along a line four inches from the opposite edge of the sheet.

Each of the rollers 2 and 2a is mounted on an axle 3 in bearings in a corresponding bellows operating casting 4. Each of these castings is moved up or down by the associated roller 2 or 2a in accordance with variations in thickness of the sheet which is passing between the pair of rollers.

A bellows mechanism 5 is attached between each of the castings 4 and an associated bellows housing 6, which has a base plate 6a, so that each of the castings 4, upon being moved in one direction or the other, expands or contracts its bellows mechanism 5.

The space 7 surrounding each bellows operating casting 4 and mechanism 5 is connected by a branch conduit 8 with a main conduit 9 or 9a. Conduit 9 is connected with a space 10 of a fluid adjusting and overload device FO, and with a branch conduit 11. Branch conduit 11 is in turn connected with space 12 of a temperature compensating arrangement TC, and with an end of another branch conduit 13. Conduit 13 is connected, at its opposite end, with space 14 of a contact operating mechanism CM.

The spaces and conduits 7 to 14, inclusive, referred to in the next preceding paragraph, contain a fluid 15.

If a sheet 1, for some cause other than variations in thickness, moves rollers 2 and 2a up or down together, fluid 15 is transferred merely from one space 7 into conduits 8 and 9a, and into the other space 7 of the same mechanism DM without changing the position of fluid 15 in conduit 9.

If, on the other hand, rollers 2 and 2a are forced further apart, due to an increase in thickness of sheet 1, the bellows mechanisms 5 will be expanded, and, together with the castings 4, will therefore force fluid 15 from conduits 8 and 9a into conduit 9. If rollers 2 and 2a move closer together, due to a decrease in thickness of sheet 1, mechanisms 5 will be compressed, and, together with castings 4, will withdraw fluid 15 from conduit 9.

Mechanism CM comprises a bellows mechanism 16, a push rod 17 reciprocable by mechanism 16, a bellows housing 18, an arm 19 rotatable about a pin 20 in a lug of housing 18, and a coil spring 21 connected between arm 19 and a projection 22 from housing 18. Spring 21, operating through arm 19, push rod 17, and bellows 16, normally maintains a given pressure on fluid 15 in the spaces and conduits 7 to 14, inclusive.

Fluid 15, upon being displaced by mechanism DM in conduits 9, 11 and 13, and space 14, drives rod 17 to push the arm 19 and extend spring 21 which thereupon increases the pressure on fluid 15. If fluid 15 is withdrawn by mechanism DM from conduits 9, 11, and 13, and space 14, rod 17 will be withdrawn proportionately, and spring 21 will retract arm 19 and maintain a lower pressure than formerly on fluid 15.

Fluid adjusting and overload device FO comprises a bellows mechanism 23, a bellows operating casting 24, an overload coil spring 25, a pressure plate 26, an adjusting screw 27, and a bellows housing comprising two parts 28 and 28a.

Screw 27 is set to bear against plate 26 so that this plate, acting through spring 25, positions the casting 24 for adjusting the amount of fluid 15 in the conduits and spaces 7 to 14, inclusive, to separate the rollers 2 and 2a to a distance which equals the minimum permissible sheet thickness. If, for example, the minimum sheet thickness is to be 0.075 inch, device FO and the quantity of fluid 15 will be adjusted so that rollers 2 and 2a will be 0.075 inch apart before sheet 1 has started between them. The structure of spring 25 is such that when the apparatus is arranged for gauging the variations in thickness of sheets having a given nominal thickness, the variations in thickness between the maximum and minimum limits for which the apparatus is set will not cause the casting 24 to compress the spring 25 further, but if a sheet having a thickness in excess of the maximum permissible thickness passes between the rollers 2 and 2a, spring 25 will yield to the pressure exerted on casting 24, so that the inner surface of the left hand end of casting 24 will be forced out of engagement with plate 26, and hence fluid will be drawn from conduit 11 into the space 10, thereby relieving the pressure in space 14 of mechanism CM and protecting the apparatus from damage.

The temperature compensating arrangement TC comprises two cylinders 29 and 29a, each of which, similarly to the bellows housing 18 of mechanism CM, encloses a bellows mechanism 16 and a push rod 17 which is reciprocable by the bellows 16. A link 30 is rotatable about a pin 31 in a lug of each of the cylinders 29 and 29a. One end of an arm 32 or 32a is screwed into one end of each of the links 30. The opposite end of arm 32a is connected by a strong coil spring 33 with a projection 22 on cylinder 29a. Two eye bolts 34, one of which has a right-hand thread, and the other of which has a left-hand thread, are pivoted at the upper ends of the links 30, and are connected with each other by a turnbuckle 35.

As previously stated, conduit 11 is connected with space 12 in cylinder 29. The corresponding space 12a of cylinder 29a is connected by conduit 36 with conduits 37, 38 and 39 which are in turn connected with wells 37a, 38a and 39a, respectively, of device FO and mechanism DM. Space 12a, conduits 36, 37, 38, and 39, and wells 37a, 38a, and 39a contain a fluid 40. Spring 33 of the arrangement TC is much stiffer than spring 21 of mechanism CM, and therefore maintains a much higher pressure on fluid 40 than spring 21 exerts on fluid 15. The quantity of fluid 40 which is forced into or drawn out of cylinder 29a because of temperature variations therefore controls the amount of fluid which is drawn into or expelled from cylinder 29 to compensate for temperature variations. The pressures exerted on fluid 15 therefore have no effect on the position of push rod 17 of cylinder 29.

Arm 19 of mechanism CM will be pulled toward the right, as shown in the drawings, by spring 21, if the associated push rod 17 is withdrawn toward the right by its bellows mechanism 16 on account of fluid 15 being withdrawn from space 14 because of a smaller thickness of sheet 1. Arm 19, while being moved toward the right, bears against a cylindrical shoulder 41 which is rigidly affixed to a contact rod 42.

Affixed to the right-hand end of rod 42, is a part a of a minimum thickness contact 43. If the portion of sheet 1 which is being measured is of a given minimum thickness or less, the part a will close contact 43 by engaging part b of this contact. Part b is attached to, but insulated from, a fixed block 44 which may be a portion of the frame which supports various other parts of the apparatus. Part a of contact 43 is grounded, through rod 42, to a supporting frame at 45. Rod 42 is supported, near its right-hand end, in a bearing 46.

Rigidly affixed to the opposite end of rod 42, is a hollow cylindrical device having a cylindrical wall 47, and closed at one end by a base wall 48. The opposite end of the cylindrical wall 47 is cut to form a helically shaped contacting surface 49.

Mounted in a fixed slab 50 is a rod 51, which is manually rotatable by a sheet variation setting knob 52 attached to one of its ends. Rigidly fastened to its opposite end is a plate 53 in which pins 54 are rigidly set. Pins 54 extend through holes in the base wall 48 of the cylindrical device which is supported in part by, and is slidable along, pins 54.

Also mounted in slab 50 is a second rod 55 which is manually rotatable by a maximum thickness setting knob 56 attached to one of its ends. Rigidly attached to the opposite end of rod 55 is second hollow cylindrical device 57 having a helically shaped contacting surface 58. Rod 55 is grounded to the supporting frame at 63.

Mounted concentrically with contact rod 42, but not in engagement with it, is an electrically insulating block 59 having a shoulder 60 at one of its ends. Carried by block 59, are two contact elements 61 and 62. Contact element 62 is attached to block 59 by a contact spring 62a from which it is normally held in an extended position by a coil spring 62b.

If sheet 1 has a given maximum thickness or greater, for which the contact element 58 has been set by knob 56, arm 19 will push block 59 toward the left so that contact element 62 will engage element 58, thereby closing the maximum thickness contact 58—62.

If sheet 1 varies in thickness, arm 19 might move rod 42 toward the right without closing contact 43. Contact element 49, since it is rigidly connected with rod 42, will move to the right with it. If now arm 19 is moved toward the left, contact element 61 might engage the contact surface 49 to thereby close the maximum variation contact 49—61 on account of there being too much variation in the thickness of sheet 1.

If more than one mechanism DM is used for measuring sheet thickness, an arm 19 of a mechanism CM for each of the mechanisms DM will be located at different angles around rod 42 for also reciprocating the rod 42 and the block 59.

A reset magnet RE is shown, having arms 64 and 65 for returning contact rod 42 and block 59 to the positions in which they are shown in the drawings, each time a sheet is about to start between rollers 2 and 2a. When a sheet has started between the rollers, magnet RE becomes deenergized, and then the arms 64 and 65 are free to be moved by shoulders 41 and 60 of contact rod 42 and block 59, respectively.

Referring now to Fig. 1aa, an enlarged view, not to scale, here shows a means for supporting the block 59 concentrically with contact rod 42 but out of engagement with it. Block 59 is supported by one end of a long arm 66 which terminates at its opposite end in a pivot block 67 supported by pivots 68 and 69 in a fixed support 67a.

In Fig. 1b, start-stop mechanisms are shown for operating contacts for controlling reset magnet RE and other parts of the apparatus as provided by the circuit diagram in Fig. 1c. A bell crank 70, rotatable about a pin 70a in a fixed block 70b, is shown with one of its arms projecting downward in the path of sheet 1. Crank 70 is retained, in the position in which it is shown, by its operating rod 71 which is in turn retained by a coil spring 72, one end of which is attached to a fixed block 73, and the other end of which is attached to a lug of rod 71. With rod 71 in this position, contact 74, which is operated by rod 71 but which is insulated from it, is closed at the front point a.

If sheet 1 is about to start between rollers 2 and 2a, when it is about one inch from them, for example, the leading edge of sheet 1 engages crank 70, shifting it to the position shown in dotted lines. Rod 71 is thereby pulled downward, opening contact 74 at its front point a, and closing this contact at its back point b.

The leading edge of sheet 1, when it has passed beyond rollers 2 and 2a about one inch, for example, engages a second bell crank 75, which is rotatable about a pin 75a in a fixed block 75b, and which is provided with a spring 72 attached at one end to a fixed block 73, similarly to crank 70, and attached at the other end to an operating rod 76. With rod 76 in the position in which it is shown in the drawings, contact 78 is closed at its front point a. When crank 75 is moved to the dotted position by sheet 1, contact 78 becomes opened at its front point a and closed at its back point b, and contact 77 becomes closed.

In Fig. 1c, four indication devices, shown as electric lamps, are designated by the reference characters + for maximum thickness, — for minimum thickness, V for maximum variation in thickness, and OK for satisfactory. The first three of these lamps are controlled by front contacts of relays each of which is designated by the reference character R followed by +, —, and V, respectively. The OK lamp is controlled by back contacts of all these relays in series.

Relays R+, R—, and RV are controlled by cold cathode OA4G trigger tubes U+, U—, and UV, respectively, and by the start-stop mechanisms shown in Fig. 1b. The starter circuits for these tubes are controlled by the maximum thickness contact 58—62, the minimum thickness contact 43, and the maximum variation contact 49—61, respectively, and by the start-stop mechanisms. The starter anode $t$ of each of these tubes is connected with its cathode through a 2-megohm resistor in multiple with a 0.25 microfarad condenser in order to prevent electrical surges from tripping the tubes falsely.

A power transformer, designated by the reference character TR, has a primary winding 79, a low voltage secondary winding 80 for providing a potential of the order of five volts, and a higher voltage secondary winding 81 for providing a potential of the order of 360 volts. Primary winding 79 is energized from a suitable source of alternating current, such for example as 110 volt, 60 cycle supply mains, having terminals BX and CX.

The heater of a 5V4G rectifier tube which is designated by the reference character UR is energized from secondary winding 80. The other secondary winding 81 in conjunction with tube UR provides high voltage direct current for operating tubes U+, U—, UV, relays R+, R—, and RV, reset magnet RE, and a bell B. Positive voltage is filtered from the cathode of tube UR by means of a choke coil CH and a 4-microfarad condenser to provide direct current at approximately 160 volts. This high voltage, low current supply is used in order that current will pass through contacts 58—62, 43, and 49—61 if they are covered by films of dirt which might prevent passage of current from a low voltage source.

As shown in Fig. 1c, the various parts of the electrical control circuits and apparatus are in the normal condition which exists when there is no sheet 1 within one inch from rollers 2 and 2a in either the entering or the leaving direction. In this condition, magnet RE, tubes U+, U—, and UV, relays R+, R—, and RV, bell B, and lamps +, —, and V are deenergized; contacts 74 and 78 are closed at their front points a, and contact 77 is open; and contacts 58—62 and 49—61 are open, and contact 43 is closed. With relays R+, R—, and RV deenergized, lamp OK is lighted by a circuit passing from terminal BX, through the back point of contact 82 of relay R+, contact 83 of relay R—, contact 84 of relay RV, and lamp OK to terminal CX. A 300 mf. condenser is charged by a circuit passing from the cathode of tube UR, through choke coil CH, a 1000-ohm resistor, back points of contacts 85, 86, and 87 of relays RV, R—, and R+, respectively, the 300 mf. condenser, and winding 81 of transformer TR to an anode of tube UR.

We shall assume that a sheet 1 approaches rollers 2 and 2a and engages crank 70, shown in Fig. 1b, thereby opening contact 74 at its front point a and closing this contact at its back point b. A circuit is thus closed for energizing reset magnet RE, this circuit passing from the cathode of tube UR, through choke CH, contacts 74—b and 78—a, a 500-ohm resistor, and winding of magnet RE to winding 81 of transformer TR. Magnet RE, upon being thus energized, will, by pulling its arms 64 and 65 toward each other, return contact rod 42 and block 59 to the positions shown in Fig. 1a, if they are not already in those positions.

A 1000-microfarad condenser is connected in multiple with reset magnet RE in order to delay its pick-up and release and thereby improve the time of operation of the apparatus.

Sheet 1, if it is thicker than the minimum thickness, will, when it starts between rollers 2 and 2a, cause contact 43 to be opened.

The leading edge of sheet 1, when it reaches a position about one inch beyond rollers 2 and 2a, will engage crank 75, shown in Fig. 1b, thereby opening contact 78 at its front point a and closing this contact at its back point b, and also closing contact 77. Reset magnet RE is deenergized by the opening of contact 78—a, leaving rod 42 and block 59 free to be moved by the arm 19 of any of the mechanisms CM. With contacts 74—b and 78—b now closed, the source of 160 volts direct current is grounded to the supporting frame at 88.

If, now, a portion of sheet 1 passing between rollers 2 and 2a is too thick, the maximum thickness contact 58—62 will become closed, thereby completing the starting circuit for tube U+, passing from the cathode of tube UR, through choke coil CH, contacts 74—b and 78—b, a 50,000-ohm resistor, ground connections 88 and 63, contact 58—62, a .5 megohm resistor, starter anode of tube U+, a 750-ohm resistor, and winding of relay R+ to winding 81 of transformer TR.

Tube U+, upon becoming conducting, completes a circuit for operating relay R+, this circuit passing from the cathode of tube UR, through choke coil CH, contact 77, tube U+, a 750-ohm resistor, and the winding of relay R+ to winding 81 of transformer TR.

Relay R+, will thereupon open its contact 82 at the back point, extinguishing lamp OK, and will close its contact 82 at the front point, thereby completing a circuit for lighting lamp +, this circuit passing from terminal BX, through the front point of contact 82, and lamp + to terminal CX.

Relay R+ also, by opening its contact 87 at the back point, breaks the charging circuit previously traced for the 300 mf. condenser. Contact 87, upon then closing at its front point, completes a circuit for discharging this condenser through bell B and thereby ringing bell B, this circuit passing from the 300 mf. condenser, through the front point of contact 87 of relay R+, and the winding of bell B back to the 300 mf. condenser. This condenser will then remain discharged until all three of the relays R+, R—, and RV are again deenergized.

Sheet 1, if it varies in thickness the maximum amount, will also cause contact 49—61 to be closed and start tube UV which then completes a circuit for energizing relay RV similarly to the manner in which relay R+ is energized as previously described. Lamp V will therefore also be lighted.

When the rear edge of sheet 1 leaves crank 70, contact 74—b will open, and contact 74—a will close. Contact 74—b, upon opening, disconnects the source of voltage from ground connection 88. Contact 74—a, upon closing, completes a branch path around contact 77 in the circuit for energizing relay R+, and also in the circuit for energizing relay RV if it has already been energized.

If sheet 1 were too thin instead of too thick, lamp — would be lighted similarly to the manner described in which lamp + would be lighted if sheet 1 were too thick.

When sheet 1 leaves rollers 2 and 2a, contact 43 will again close, but the starter circuit for tube U— will be open at contact 74—b.

When sheet 1 leaves crank 75, contacts 77 and 78 will be restored to their original positions in preparation for the next sheet.

The relay or relays which have been energized because of sheet 1 will remain energized, and the corresponding lamp or lamps will remain lighted until the next succeeding sheet engages crank 70 and thereby opens contact 74—a in the relay retaining circuits.

Fig. 2 shows a plate 91 provided with indicia for showing the conditions of thickness of a sheet in accordance with the height of fluid in conduit 13.

Although we have herein shown and described only two forms of apparatus embodying our invention, it is understood that various changes and modifications may be made therein within the scope of the appended claims without departing from the spirit and scope of our invention.

Having thus described our invention, what we claim is:

1. Dimension gauging apparatus comprising in combination, a pair of gauging bellows oppositely disposed with respect to a given dimension to be measured, a pair of gauging devices one of which bears against a given surface and the other of which bears against an opposite surface of a piece of material having said given dimension between said surfaces, means controlled by each of said gauging devices for operating the gauging bellows which is on the same side of said piece of material, and dimension indicating means controlled by said bellows according to the magnitude of said given dimension.

2. Dimension gauging apparatus comprising in combination, a pair of fluid pressure control devices oppositely disposed with respect to a given dimension to be measured, a pair of gauging devices one of which bears against a given surface and the other of which bears against an opposite surface of a piece of material having said given dimension between said surfaces, means controlled by each of said gauging devices for operating the fluid pressure control device which is on the same side of said piece of material, and dimension indicating means controlled by said fluid pressure control devices according to the magnitude of said given dimension.

3. Dimension gauging apparatus comprising in combination, a pair of bellows oppositely disposed with respect to a given dimension of a piece of material to be measured, means bearing on opposite surfaces of said piece of material for effecting operation of said pair of bellows in accordance with the magnitude of said given dimension, an indication bellows connected by conduit with said pair of bellows, a fluid displaced in said conduit by said pair of bellows in accordance with the magnitude of said given dimension for operating said indication bellows, and indication means controlled by said indication bellows.

4. Sheet thickness gauging apparatus comprising in combination, a pair of rollers oppositely disposed with respect to the thickness of a sheet which is being measured, a control bellows mechanism for each of said rollers each operable by its roller in accordance with the thickness of a sheet which is being measured, indication bellows means connected by conduit with said control bellows mechanisms, a fluid controlled by said control bellows mechanisms through said conduit for operating said indication bellows means, and indication means controlled by said indication bellows means for indicating the thickness of a sheet which is being measured.

5. Sheet thickness gauging apparatus comprising in combination, a pair of bellows devices operable in accordance with the thickness of a sheet which is being measured, indication bellows means connected by conduit with said pair of bellows devices, a fluid controlled by said pair of bellows devices through said conduit for operating said indication bellows means, a maximum thickness contact closed by said indication bellows means if said sheet has a given maximum thickness, a minimum thickness contact closed by said indication bellows means if said sheet has a given minimum thickness, a maximum variation contact closed by said indication bellows means independently of the magnitudes of said given minimum and maximum thicknesses if the difference between the smallest and the largest thickness measurements made of said sheet is of a given maximum magnitude or greater, and indication means controlled by said contacts.

6. In dimension gauging apparatus including a pair of contacting devices each of which is oppositely movable with respect to the other and one of which engages one surface and the other of which engages the opposite surface of a piece of material while said piece of material is being passed between said contacting devices, two bellows operating pieces one for each of said contacting devices each attached to and movable with its contacting device, two bellows housings each of which contains a bellows mechanism one of which is attached to and operable by one of said bellows operating pieces and the other of which is attached to and operable by the other of said bellows operating pieces, a conduit connected between spaces confined in said bellows housings by said bellows mechanisms, a fluid contained in said spaces and said interconnecting conduit, and dimension indicating means controlled by the transfer of said fluid between said spaces and said conduit by said bellows mechanisms in response to variations in the dimension between said opposite surfaces of said piece of material.

7. Dimension gauging apparatus comprising in combination, a pair of rollers each of which is movable radially with respect to the other and one of which engages one surface and the other of which engages the opposite surface of a piece of material while said piece of material is being passed between said rollers, two bellows operating pieces one for each of said rollers, two axles one for each of said rollers on each of which the associated roller is mounted in a bearing in the associated bellows operating piece, two bellows housings each of which contains a bellows mechanism one of which is attached between a fixed portion of its housing and one of said bellows operating pieces and the other of which is attached between a fixed portion of its housing and the other of said bellows operating pieces, a conduit connected between spaces in said bellows housings confined by said bellows mechanisms, a fluid contained in said spaces and said interconnecting conduit, and dimension indicating means controlled by the transfer of said fluid between said spaces and said conduit by said bellows mechanisms according to the magnitude of the dimension between said opposite surfaces of said piece of material.

8. In dimension gauging apparatus including a pair of contacting devices each of which is oppositely movable with respect to the other and one of which engages one surface and the other of which engages the opposite surface of a piece of material while said piece of material is being passed between said contacting devices, two fluid chambers one for each of said contacting devices, two reciprocable devices one in each of said chambers and each connected to and reciprocable with the associated contacting device, a conduit connected between spaces in said chambers confined by said reciprocable devices, a fluid contained in said spaces and said interconnecting conduit, and dimension indicating means controlled by said fluid according to the movements of said reciprocable devices with said contacting devices in response to variations in the dimension between said opposite surfaces of said piece of material.

9. In dimension gauging apparatus, two fluid chambers each containing a reciprocable device, a contacting device for each of said reciprocable devices each connected to be reciprocated with its reciprocable device and one of which engages one surface and the other of which engages an opposite surface of a piece of material while said piece of material is being passed between said contacting devices, a conduit connected between spaces in said chambers confined by said reciprocable devices, a fluid contained in said spaces and said interconnecting conduit, and dimension indicating means operable by said fluid according to the positioning of said reciprocable devices controlled by said contacting devices in response to the magnitude of the dimension between said opposite surfaces of said piece of material.

10. In dimensions gauging apparatus, two fluid chambers each containing a reciprocable device, a contacting device for each of said reciprocable devices each connected to be reciprocated with its reciprocable device and one of which engages one surface and the other of which engages an opposite surface of a piece of material while said piece of material is being passed between said contacting devices, an indication fluid chamber containing a reciprocable device, a conduit interconnecting spaces in said three fluid chambers confined by said reciprocable devices, means for applying pressure to said fluid through the reciprocable device in said indication fluid chamber, and indication means operable by the reciprocable device in said indication fluid chamber in response to displacement of said fluid by said other reciprocable devices at times in opposition to and at other times in cooperation with pressure exerted on said fluid through the reciprocable device in said indication fluid chamber.

11. In dimension gauging apparatus including a contact operating device movable in a first or a second direction according to the magnitude of a given dimension of a piece of material being measured, the combination comprising, a contact rod having intermediate its ends a fixed shoulder against which said contact operating device bears when moved in said first direction for reciprocating said contact rod to close a minimum dimension contact if the given dimension of said piece of material is of a given minimum magnitude or less, a maximum variation contact element affixed to said contact rod, a contact block mounted concentrically with said contact rod but out of engagement with it and reciprocable by said contact operating device when moved in said second direction without moving said contact rod, a maximum variation contact element mounted on said contact block for engagement with the maximum variation contact element affixed to said contact rod if said given dimension has a given maximum variation or greater, a maximum dimension contact closed by said contact block if said given dimension is of a given maximum magnitude or greater, and means for restoring said contact rod and said contact block to a given normal position in preparation for measuring a piece of material.

12. In dimension gauging apparatus, the combination comprising, a contact operating device movable in a given direction to close a given minimum dimension contact if a given dimension of a piece of material which is being measured is of a given minimum magnitude or less, a second contact operating device movable in the opposite direction independently of said first contact operating device for closing a given maximum dimension contact if said given dimension is of a given maximum magnitude or greater, a maximum variation contact closed jointly by movement of said first contact operating device in said given direction and by movement of said second contact operating device in said opposite direction if said given dimension has a given maximum variation or greater, and means for restoring said first and second contact operating devices to a given normal position in preparation for measuring a piece of material.

13. An adjustable contact device comprising, a rotatable cylindrical device one end of which is cut to form a contact element having a helically shaped contacting surface, and a second contact element movable in a given direction or in the opposite direction along a straight line parallel to the cylindrical surface of said device for engaging said helically shaped contacting surface.

14. In dimension gauging apparatus in which a fluid is displaced in a main closed container in accordance with the magnitude of a given dimension of a piece of material being measured, an auxiliary container connected with said main container, a bellows mechanism in said auxiliary container, a spring arranged to keep said bellows mechanism in a given position if the magnitude of said given dimension does not exceed a given maximum value but to permit said bellows mechanism to be compressed for withdrawing fluid from said main closed container if said given dimension exceeds said given maximum value.

15. Dimension gauging apparatus comprising in combination, a pair of gauging devices one of which bears against one surface and the other of which bears against an opposite surface of a piece of material while said piece of material is being passed between said gauging devices, means controlled by said gauging devices for closing a minimum dimension contact if the dimension between said surfaces is of a given minimum magnitude or less and for closing a maximum dimension contact if said dimension is of a given maximum magnitude or greater and also for closing a maximum variation contact if the difference between the smallest and largest measurements made of said dimension is of a given magnitude or greater, and indication means controlled by said contacts.

16. Dimension gauging apparatus comprising in combination, a pair of gauging devices bearing against opposite surfaces of a piece of material which is being measured, means controlled by said gauging devices for closing a minimum dimension contact or a maximum dimension contact if the dimension between said surfaces is of a given minimum magnitude or less or is of a given maximum magnitude or greater respectively and for closing a maximum variation contact if the difference between the smallest and largest measurements made of said dimension is of a given maximum value or greater, a cold cathode trigger tube for each of said contacts, a starter circuit for each of said tubes each controlled by the corresponding one of said contacts, a relay for each of said tubes, a circuit controlled by each of said tubes for energizing its relay after its starter circuit becomes closed by the corresponding one of said contacts and for then retaining its relay in the energized condition after its starter circuit becomes opened by the corresponding one of said contacts, and indication means controlled by each of said relays.

17. Dimension gauging apparatus comprising in combination, a pair of gauging devices bearing against opposite surfaces of a piece of material which is being measured, a cold cathode trigger tube, means controlled by said gauging devices for closing a starter circuit for said tube if the dimension between said surfaces is of a given magnitude, means for retaining said tube energized after its starter circuit becomes opened for energizing an indication device, and means controlled by a second piece of material upon being positioned to be measured by said gauging apparatus for deenergizing said tube.

18. Dimension gauging apparatus comprising in combination, a pair of gauging devices bearing against opposite surfaces of a piece of material which is being measured, a first and a second and a third cold cathode trigger tube, means controlled by said gauging devices for closing a starter circuit for said first tube if the dimension between said surfaces is of a given minimum magnitude or less and for closing a starter circuit for said second tube if the dimension between said surfaces is of a given maximum magnitude or greater and also for closing a starter circuit for said third tube if the difference between the smallest and largest measurements made of said given dimension is of a given maximum value or greater, means controlled by each of said tubes after its starter circuit becomes closed for energizing indication means and for then retaining said indication means energized, and means controlled by a second piece of material upon being positioned to be measured by said gauging apparatus for deenergizing said tubes.

19. In dimension gauging apparatus, contact operating mechanism controlled by said gauging apparatus while a given dimension of a piece of material is being measured by said gauging apparatus for closing a minimum dimension contact if said given dimension is of a given minimum magnitude or less and for closing a maximum dimension contact if said dimension is of a given maximum magnitude or greater and also for closing a maximum variation contact if the difference between the smallest and largest measurements made of said given dimension is of a given magnitude or greater.

20. In dimension gauging apparatus in which a fluid is displaced in a main closed container in accordance with the magnitude of a given dimension of a piece of material being measured, the combination comprising, an auxiliary container connected with said main container, and a fluid control mechanism in said auxiliary container including an adjusting screw acting through a spring for positioning a portion of said fluid control mechanism for adjusting the quantity of fluid in said closed container to a given amount for any given minimum dimension of a piece of material to be measured.

21. In dimension gauging apparatus in which a fluid is displaced in a main closed container in accordance with the magnitude of a given dimension of a piece of material being measured, the combination comprising, an auxiliary container including a fluid control mechanism connected with said main container, a temperature compensating fluid container including a second fluid control mechanism arranged to normally exert a pressure on fluid contained in said temperature compensating container but operable against or in cooperation with said normally exerted pressure in response to changes in volume of said fluid in said temperature compensating container due to changes in temperature, and means controlled by said second fluid control mechanism for operating said first fluid control mechanism to maintain a constant volume of fluid in said main closed container under varying temperature conditions.

NORMAN FREDERICK AGNEW.
WILLARD P. PLACE.